Patented Sept. 1, 1931

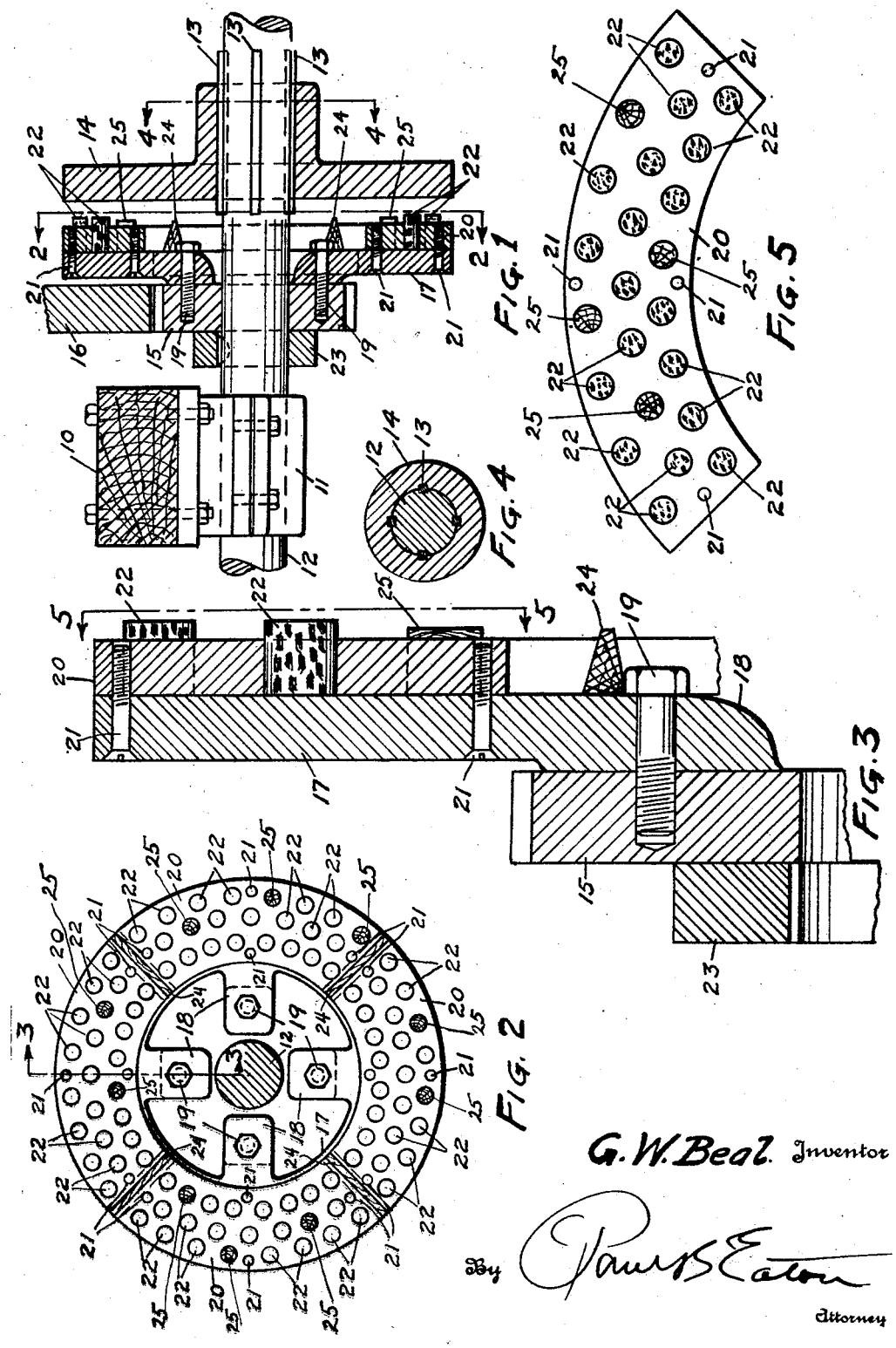

1,821,335

UNITED STATES PATENT OFFICE

GEORGE W. BEAL, OF WINSTON-SALEM, NORTH CAROLINA, ASSIGNOR OF ONE-HALF TO SAMUEL R. GLASS, OF FORSYTH COUNTY, NORTH CAROLINA

FRICTION CLUTCH

Application filed December 7, 1928. Serial No. 324,454.

My invention relates to a friction clutch having cork inserts therein, with the parts holding the cork inserts being capable of easy removal when it is desired to refill the clutch with a new set of cork inserts.

An object of my invention is to provide a friction clutch having a circular portion for holding cork inserts, with said circular portion being cut into four separate pieces, so as to permit the cork insert holding members to be easily removed when it is necessary to refill the same with a new set of inserts.

In the drawings I have shown my invention in connection with mechanism adapted to be used in looms, but it is evident that the same may be used in any type of machinery in which this type of friction clutch is used.

Some of the objects of my invention having been stated, other objects will appear as the description proceeds when taken in connection with the accompanying drawings, in which—

Figure 1 is a side elevation of my device, showing practically all of the parts in cross-section;

Figure 2 is a front view of the cork insert holding portion, taken along the line 2—2 in Figure 1;

Figure 3 is an enlarged, detailed, cross-sectional view, taken along the line 3—3 in Figure 2;

Figure 4 is a cross-sectional view taken along the line 4—4 in Figure 1;

Figure 5 is an enlarged, detailed view taken along the line 5—5 in Figure 3.

Referring more specifically to the drawings, the numeral 10 indicates the framework, preferably of a loom, and on the lower side of this member 10 is secured the bearing member 11, in which the drive shaft 12 of the loom is mounted, and in this shaft four longitudinally disposed grooves are cut in which the keys 13 are tightly driven, and on this shaft 12 is mounted the disc member 14, the bearing portion of the disc member 14 having grooves therein which mesh with the keys 13 loosely, so as to permit sliding movement of the disc 14 with relation to the shaft 12. Suitable means, not shown, may be provided for moving the disc 14 along the shaft 12 and holding the same in position.

Loosely mounted on the shaft 12 is the gear wheel 15, and the collar 23 is rigidly secured on the shaft 12, against which the gear wheel 15 bears when the disc 14 presses against the cork inserts, which meshes with the gear 16 which also meshes with other gears for the driving of the loom, and on one side of the gear wheel 15 there is secured the annular member 17 which has the inwardly projecting arms 18 which are secured to the gear 15 by means of the bolts 19. To one side of this annular member 17 there is secured th quadrants 20 by means of the bolts 21, and these quadrants have a plurality of holes therein in which the cork inserts 22 are adapted to fit, and the face of the disc 14, when pressed against these cork inserts, will engage with the same and cause the gear 15 to travel with the disc 14.

I am aware that cork inserts for this type of clutch have heretofore been used, but these have been placed, either in the annular member 17 or in a continuous ring member secured to the annular member which necessitates the removal of the disc 14 from the shaft 12 together with the operating mechanism for holding the disc 14 in position, which requires much labor, but in my device, the lower quadrant 20 in Figure 2 can be easily removed by removing the bolts 21 and the same can be supplied with new inserts and placed again in position, and likewise the side quadrants can also be refilled, necessitating only the rotating of the shaft 12 a quarter turn to refill the top quadrant, and if I desire, I can dispense with the center bolts 21 in each quadrant and thus permit the removal, refilling and replacing of each quadrant without moving the shaft 12 or the disc 14 in any manner.

Wooden wedges 24 are driven between the sections 20 and also certain of the inserts as indicated by 25 are made of wood, and these are shorter than the inserts 22, so that when the inserts 22 wear down level with the wooden inserts 24 and 25 the clutch will be worn to the point where new inserts 22 must be substituted and this will prevent the inserts from wearing level with the sections 20, in which case fire might result from the disc 14 rubbing against the sections 20.

In the drawings and specification I have set forth a preferred embodiment of my invention, and although specific terms are employed, they are used in a generic and descriptive sense only, and not for purposes of limitation, the scope of the invention being set forth in the appended claim.

I claim:

In a friction clutch, a shaft, a disk, a gear wheel loosely mounted on said shaft, an enlarged annular member secured to one side of said gear wheel, a sectional annular member secured to the first-named annular member and being divided into quadrants wedges between the quadrants, the said quadrants being adapted to have inserted therein circular cork members, said quadrants being adapted to be secured to the first-named annular member by means of suitable bolts.

In testimony whereof I affix my signature.

GEORGE W. BEAL.